United States Patent [19]

Merritt

[11] Patent Number: 5,318,611
[45] Date of Patent: Jun. 7, 1994

[54] METHODS OF MAKING OPTICAL WAVEGUIDES AND WAVEGUIDES MADE THEREBY

[75] Inventor: Trevor Merritt, Los Angeles, Calif.

[73] Assignee: Ensign-Bickford Optical Technologies, Inc., Van Nuys, Calif.

[21] Appl. No.: 851,489

[22] Filed: Mar. 13, 1992

[51] Int. Cl.$^5$ .................................. C03B 37/023
[52] U.S. Cl. ...................... 65/3.12; 65/3.11; 65/900
[58] Field of Search ................ 65/2, 3.12, 900, 3.11

[56] References Cited

U.S. PATENT DOCUMENTS

| | | | |
|---|---|---|---|
| 3,459,522 | 8/1969 | Elmer et al. | 65/33 X |
| 3,806,570 | 4/1974 | Flamenbaum et al. | 264/66 |
| 3,868,170 | 2/1975 | DeLuca | 65/3.12 X |
| 3,932,162 | 1/1976 | Blankenship | 65/3.12 |
| 3,933,454 | 1/1976 | DeLuca | 65/3.12 |
| 4,045,198 | 8/1977 | Rau et al. | 65/33 |
| 4,165,915 | 8/1979 | Rau et al. | 65/3.12 X |
| 4,224,046 | 9/1980 | Izawa et al. | 65/3.12 |
| 4,345,928 | 8/1982 | Kawachi et al. | 65/18.2 |
| 4,367,013 | 1/1983 | Guerder et al. | 65/3.12 X |
| 4,367,085 | 1/1983 | Suto et al. | 65/18.2 |
| 4,372,648 | 2/1983 | Black | 65/3.12 X |
| 4,378,985 | 4/1983 | Powers | 65/3.12 |
| 4,385,802 | 5/1983 | Blaszyk | 65/3.12 X |
| 4,421,539 | 12/1983 | Edahiro et al. | 65/3.12 |
| 4,428,762 | 1/1984 | Andrejco et al. | 65/3.12 |
| 4,465,708 | 8/1984 | Fanucci et al. | 427/163 |
| 4,493,720 | 1/1985 | Gauthier | 65/3.12 |
| 4,552,576 | 11/1985 | Hara et al. | 65/2 |
| 4,608,070 | 8/1986 | Roba | 65/3.12 |
| 4,618,354 | 10/1986 | Suda et al. | 65/2 |
| 4,627,866 | 12/1986 | Kanamori et al. | 65/3.12 |
| 4,629,485 | 12/1986 | Berkey | 65/3.11 |
| 4,715,875 | 12/1987 | Jacobson | 65/3.11 |
| 4,726,827 | 2/1988 | Powers | 65/3.12 |
| 4,729,777 | 3/1988 | Mimura et al. | 65/3.13 |
| 4,735,475 | 4/1988 | Watanabe et al. | |
| 4,740,226 | 4/1988 | Toda | 65/11.1 |
| 4,741,748 | 5/1988 | Lane et al. | 65/13 |
| 4,812,153 | 3/1989 | Andrejco et al. | 65/3.12 |
| 5,028,246 | 7/1991 | Sarkar | 65/3.12 |

FOREIGN PATENT DOCUMENTS

| | | | |
|---|---|---|---|
| 60-145926 | 8/1985 | Japan | 65/3.12 |
| 61-10037 | 1/1986 | Japan. | |
| 63-315531 | 12/1988 | Japan | 65/3.12 |
| 2105488 | 3/1983 | United Kingdom. | |

Primary Examiner—Robert L. Lindsay
Attorney, Agent, or Firm—Merchant, Gould, Smith, Edell, Welter & Schmidt

[57] ABSTRACT

Low attenuation, low dispersion of optical waveguides are provided by a process initiating with axial deposition of a high velocity core soot stream impinging on a target at a high angle of incidence relative to the axis of rotation of the target. A core cylinder is built up axially by relative movement between the soot stream and target during deposition, the movement being non-constant in order to maintain a substantially constant diameter with a constant deposition rate. A cladding layer is then built up by deposition of soot radially on the core. Subsequent drying and sintering provides a vitreous preform which may be drawn directly into optical waveguides. Alternatively, the sintered product may be drawn down to smaller rods, which then are covered with further deposited soot cladding to a desired final thickness, and after further drying and sintering may be drawn to optical waveguides.

4 Claims, 3 Drawing Sheets

METHODS OF MAKING OPTICAL WAVEGUIDES AND WAVEGUIDES MADE THEREBY

BACKGROUND OF THE INVENTION

This invention relates to methods of making optical waveguides, optical waveguide preforms and other optical products requiring high quality by vapor deposition techniques, and more particularly to an improved method to dry and consolidate porous waveguide preforms of vitreous particles in order to lower residual water content and entrapped gases.

The most commonly used techniques for low attenuation optical waveguide manufacture at present are based on dissociation in a flame of glass forming constituents, i.e. flame hydrolysis, to build up a porous waveguide preform of vitreous particles called "soot". The porous soot preform is converted to a glassy state by drying and consolidation at elevated temperatures. The desired combination of core and cladding layers is drawn under temperature and tension to the desired final diameter of the optical waveguide or fiber. As the usage of optical waveguides has increased, the technical requirements for communications systems have also become more demanding. In the current state of the art, signal attenuation of 0.4 dB per kilometer, low dispersion, and precise cutoff wavelength characteristics are required. These factors dictate that, in addition to reliable and predictable control of the refractive index profile as defined by the core and cladding geometries and materials, there must also be very low impurities and a homogeneous microbubble-free structure in the optical waveguide.

One major cause of light attenuation by scattering or absorption is due to the presence of residual water or other entrapped gases within the glass material. Residual water means the glass contains either OH, $H_2$ or $H_2O$, but in essence is the OH, or hydroxl ion that is present. It is necessary to restrict hydroxyl ion content to keep losses low, because OH ions, introduced at interfaces or during processing, are representative of $H_2O$ content, which is directly proportional to absorption losses. In order to produce optical waveguides wherein attenuation is kept below 0.4 db per kilometer, residual water content within the glass must be reduced to low levels. In addition, microbubbles and foreign particles may also be entrapped within the glass material or at the core and cladding interface and thus become a source of light scattering centers.

Various procedures and processes have been utilized to reduce residual water content in flame hydrolysis produced porous waveguide preforms. In U.S. Pat. No. 3,868,170, there is disclosed a method of drying and consolidating a flame hydrolysis produced porous waveguide preform by placing it in a controlled environment in which a predetermined desired concentration of gases is maintained. The porous preform is then heated to a temperature below the sintering temperature of the glass to permit entrapped gas to escape therefrom. The temperature is maintained until an equilibrium is reached between the partial pressure of the entrapped gas in the preform and the partial pressure of the same gas in the environment. The preform is then heated to at least the sintering temperature of the glass in order to sinter the porous preform and form a consolidated preform.

U.S. Pat. No. 3,933,454 discloses a method for producing glass with low residual water by heating the soot preform to a temperature within the consolidation temperature range for a time sufficient to cause the soot particles to fuse and form a dense glass layer while simultaneously subjecting the soot preform to a stream of a substantially dry atmosphere containing chlorine. The chlorine permeates the porous soot preform during the consolidation thereof and replaces hydroxl ions with chlorine ions, thereby resulting in a glass that is substantially water-free. Other methods also teach the necessity of using chlorine as a drying and cleaning agent during both the drying and consolidation of the porous soot preform.

Because of the need for continually lowering the attenuation of optical waveguides, improvement in the methods of obtaining optical waveguides with low residual water content is required. Therefore, it is evident that a method of producing a waveguide preform which is substantially free of residual water and other entrapped gases from which may be formed, an optical waveguide that will not cause excessive light absorption losses or excessive dispersion of the transmitted light, and does not have light scattering centers within the optical waveguide core or the core/cladding interface is desired.

SUMMARY OF THE INVENTION

Processes in accordance with the present invention incorporate axial deposition of core material using a high velocity laminar soot stream directed at a rotating initial target, to build up a uniform diameter core cylinder. Then pass-by-pass radial deposition of cladding is used until a large porous soot preform body having a given t/a ratio is obtained. This porous preform may be large enough to be drawn directly into optical waveguides after drying in a chlorine environment, and then sintering in a chlorine free environment in accordance with this invention, or alternatively, the initial porous preform may be dried in a chlorine environment and then sintered in a chlorine free environment in accordance with this invention, drawn down, built up with additional cladding soot, and again dried in a chlorine environment, and sintered in a chlorine free environment in accordance with this invention and then drawn to final dimension. Preforms can be fabricated that have large diameters and high mass, so that an extremely long optical waveguide can be drawn from bodies formed with high deposition rates and low costs.

More specifically in accordance with the present invention, a small pure silica starter element is rotated about a its axis as a flame hydrolysis burner directs a soot stream of core material against the starter element at an angle greater that 60° to the axis and at a velocity such that the laminar soot stream has a Reynolds number in the range of 100 or above. Excess stream matter is exhausted to a vertically separated outlet along the path of the impinging soot stream. The burner and soot stream are held along the central axis as the target and forming core cylinder are initially reciprocated to form a bulbous soot tip. The soot tip is then withdrawn at a rate that is controlled by sensing the position of the end of the cylinder and modulating the withdrawal mechanism to maintain a substantially constant growth rate. The result is a substantially constant diameter core. When a predetermined length of core soot rod has been built up, a soot cladding layer is separately added by radial deposition to a thickness at least equal to the core radius. The soot core cylinder is rotated and also reciprocated back and forth in front of the cladding burner to build the cladding to the needed radial thickness. This sequence provides a low hydroxyl ion, void free, soot-soot interface. Both deposition steps are cost efficient and carried out at high rates. The chosen thickness of core and cladding is then dried and consolidated by sintering. The drying and sintering steps are carried out in a furnace which contains a muffle tube which contains the porous waveguide preform which is to be dried and sintered. Flows of various gases are injected at controlled rates into the muffle tube through the inlet opening. For initial drying, the porous preform is inserted into muffle tube and is lowered into the hot zone of the furnace and the temperature is raised to the drying temperature. The porous preform is dried and then the muffle and preform are purged. The preform is raised out of the hot zone and the temperature is raised to the sintering temperature. The preform is then consolidated by sintering by being lowered into the hot zone at a controlled rate. The sintering causes the porous preform to be fully consolidated or sintered into a clear glass rod preform.

The preform is then drawn and cut to form intermediate rods. These rods then receive additional cladding to the total thickness needed to establish the needed cutoff wavelength characteristics in the final drawn optical waveguide.

In one alternative process the axially deposited core is small and the cladding layer is comparably larger. Using a large furnace, drying and sintering as discussed above, provides a glass preform which can be drawn directly to a single mode optical waveguide of desired characteristics. In another alternative process the operating parameters are varied during core deposition to provide, after drying and sintering, gradient index, multi-mode fibers.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
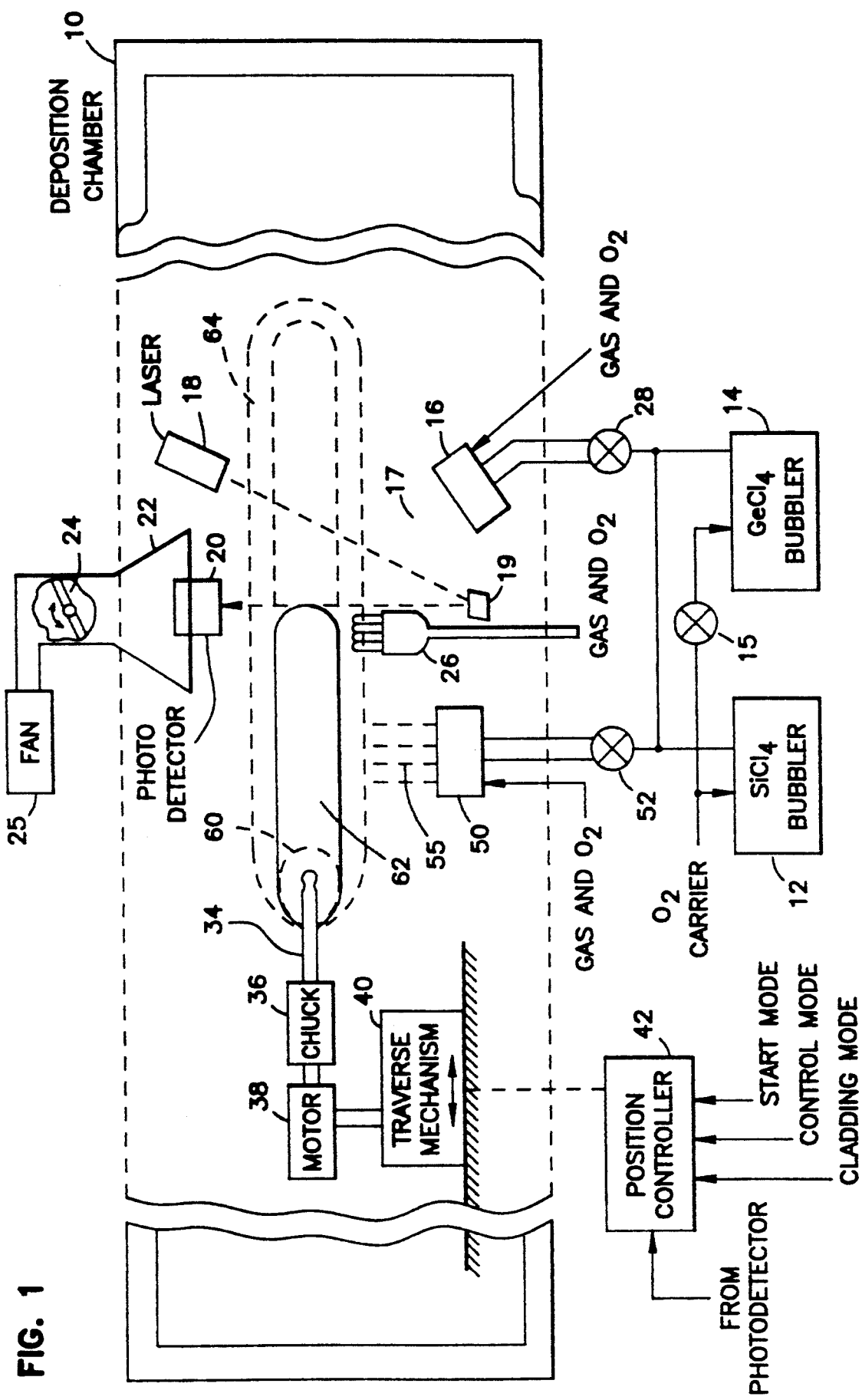
FIG. 1 is a combined simplified perspective and block diagram view of a system in accordance with the invention for fabricating optical waveguide preforms.

Most of the operative elements of a system in accordance with the invention, referring now to FIG. 1, are mounted within a large enclosed deposition chamber 10. Chamber 10 has a controlled air inlet that provides laminar air flow in the region of deposition. A first bubbler 12, which may be inside or outside the chamber 10, contains purified precursor materials such as a silica compound, here $SICl_4$. Silica glass precursor vapors are forced out of the first bubbler 12, by directing a carrier gas, specifically oxygen or another suitable medium, under pressure into the bubbler 12. Also included is a second bubbler 14 containing purified precursor dopant materials, here specifically a germania compound, $GeCl_4$. Dopant precursor vapors are also forced out of the second bubbler 14 by the $O_2$ carrier. A valve 15 in the $O_2$ carrier line can be operated to shut off the second bubbler 14 when desired. The entrained glass forming compounds in the vapor stream are mixed and are dissociated, in known fashion, upon being fed into a first burner 16 held, in this example, in substantially fixed position relative to the deposition zone. The first burner 16 generates a streamlined soot stream 17 that is directed at an angle of inclination of 65° relative to the rotational axis. A narrow light beam from a laser 18 is directed off a mirror 19 and onto a photodetector 20. The beam of the mirror 19 is angled to intercept the axis at the geometric center of the deposited material, as described later. The soot stream 17 is, however, not centered on the geometric center but is offset both vertically and laterally predetermined amounts, discussed in greater detail below. The light beams can be positioned to intercept the central axis at any angle relative to the horizontal or vertical directions that is free of interference from associated equipment, being shown angled off the vertical only for clarity. The chemical components in the soot stream 17 are at a velocity of 40 ft/sec., while other gases are at about 25 ft/sec. An exhaust outtake 22 immediately adjacent the target area collects gases and non-impinging particulates at a gas flow rate of approximately 300 ft/min, as preset by a butterfly valve 24 in the exhaust system path to a fan 25. An end burner 26 adjacent the first burner 16 aids in bringing the temperature at the point of deposition up to a given level before deposition begins. A valve 28 can be turned on or off to control usage of the first burner 16.

Within the deposition chamber 10 a relatively short length of silica bait rod 34 is centered along the reference axis on a chuck 36. The chuck 36 and bait rod 34 are rotated at a selected rate of 10 r.p.m., for core deposition, by a rotary drive 38 mounted on a linear traverse mechanism 40. A position controller 42 receiving signals from the photodetector 20 in the core deposition mode can run the traverse mechanism 40 unidirectionally, and at a desired rate. The traverse mechanism 40 can be made to reciprocate through any chosen length of travel at a desired rate by bypassing the position controller 42. In the core deposition mode the bait rod 34 is first reciprocated through a short distance, and thereafter moved unidirectionally under position control. The traverse mechanism 40 can also reciprocate through a substantial total length, here about 40 cm, for deposition of cladding.

A second burner 50 within the deposition chamber 10 is spaced along the reference axis from the bait rod 34 and separately used for deposition cladding. The second burner 50 is fed from the first bubbler 12, when a valve 52 is open, with a particulate forming compound, here pure silica, by the $O_2$ carrier gas. A second soot stream 55 is generated at a later time that is pointed perpendicularly to the reference axis.

Figure 2:
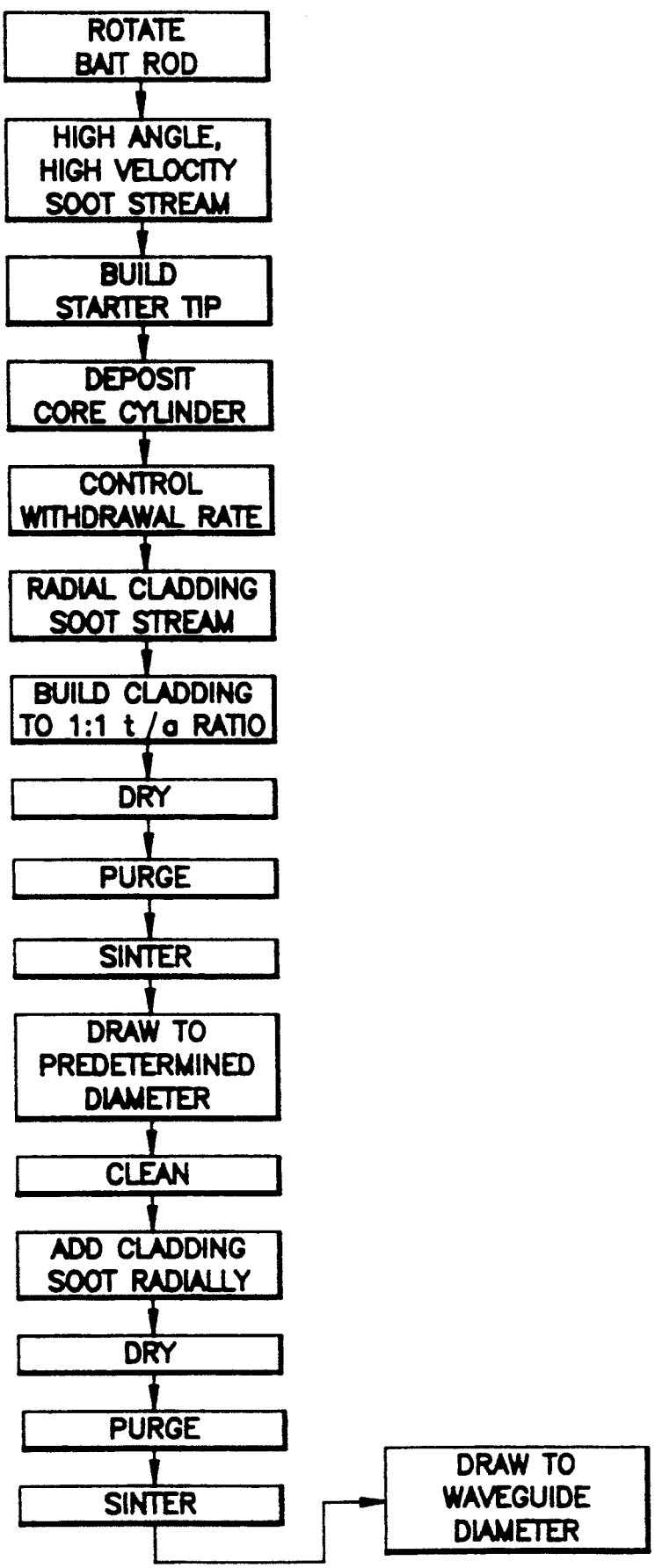
FIG. 2 is a block diagram of steps in a method for fabricating optical waveguide in accordance with the present invention.

FIG. 2 shows the process steps which are followed to fabricate an optical waveguide in accordance with this invention. To form a core cylinder or start rod for an optical waveguide preform, the deposition chamber 10 is first cleaned, and the bait rod 34 is mounted in the chuck 36, and centered on the axis of rotation. The first burner 16 is positioned with respect to the laser beam that defines the tip of the deposited material during position control. The first burner 16 is then lit, the exhaust velocity being maintained, and conditions are allowed to stabilize before the bait rod 34 is rotated at about 20 r.p.m. by the drive 38, and advanced into the path of the first soot stream 17 containing core particulates. The soot stream 17 impinges at its high angle of incidence on and about the leading end of the bait rod 34, which is oscillated back and forth at a rate of about 45 cm/hr. A bulbous starter tip 60 develops over the free end of the bait rod 34, to a length of approximately 2 cm. When sufficient material has been deposited, this bulbous tip 60 forms an adequate base or anchor for development of a soot core cylinder 62.

Axial development of the soot core cylinder 62 commences with the position controller 42 initially providing a fixed withdrawal rate of 12 cm/hr. The first soot stream 17 sprays the end of the bulbous starter tip 60, initializing the core cylinder 62. With the chemical constituents of the soot stream at a velocity of 40 ft/sec and other gases having a velocity of 25 ft/sec the flow in the stream 17 is laminar, the Reynolds number is approximately 1000 and the deposition rate is approximately 0.14 grams per minute. The high flow rate accompanied by some overspray, but the gases that bypass the core cylinder 62 are exhausted through the outtake 22. As deposition of the core cylinder 62 begins, the withdrawal rate of 12 cm/hr. is slightly faster than the cylinder 62 growth rate, but enables growth to be equilibrated on the bulbous starter tip 60. The position controller 42 is then switched to the servo mode, with the laser beam intercepting the geometric center of the free end of the core cylinder 62. The position controller 42 responds to the signals from the photodetector 20 by withdrawing the core cylinder 62 so as to maintain its free end in a constant position as matter is deposited. This establishes a non-constant withdrawal rate of between 6 and 8 cm./hr., to give a preform about 2.5 cm in diameter.

The core cylinder 62 continues to grow and be withdrawn by the traverse mechanism 40 until a total length in excess of 20 cm. This discontinuous operation enables better overall control, because it is carried out without intermixing of particulates of gases and without need for synchronization of steps.

With the desired length of core cylinder 62 developed, the first burner 16 is turned off, and the second burner 50 is ignited and allowed to stabilize. The traverse mechanism 40 is then actuated to reciprocate the length of the core cylinder 62 in opposition to the second burner 50. With the core cylinder 62 being turned at 20 r.p.m. by the rotary drive 38, the second burner 50 is held at a substantially constant distance of about 17.5 cm from the axis of rotation of the core cylinder 62. The cylinder 62 is then traversed back and forth along the axis relative to the second, cladding, soot stream 55 by movement of the traverse mechanism 40 at a rate of about 250 cm/hr. Deposition of a pure silica soot particulate takes place at an average rate of approximately 2.5 grams per minute derived by flame hydrolysis of the carrier borne vapor from the first bubbler 12. The deposition temperature at the surface of the core cylinder 62 is gradually raised to a normal operating level by incrementally increasing the gas/oxygen flow rates over the first fifteen minutes of operation, until a thin contact layer of approximately 5 mm has been deposited on the core cylinder 62. The resultant lower temperatures avoid boiloff of germania from within the soot core cylinder 62, but the initially deposited cladding particulate nonetheless firmly unites to the surface of the core soot. The cladding also completely conforms to variations in the core cylinder 62 surface, which appear as surface waviness along the length in as much as diameter cannot be held exactly constant. Thus the interface between the core cylinder 62 and a fully developed outside cladding layer 64 is in the nature of a very thin transitional layer of substantially constant characteristics and very low moisture content, factors which are of substantial significance to the refractive index profile and hydroxyl ion content of the ultimate optical waveguide.

Deposition of cladding layer 65 is continued until a final diameter of approximately 10.5 cm is obtained, giving a ratio of cladding thickness (t) to core radius (a) of 2:1 or greater in this example. This soot preform has a mass of approximately 550 grams for a 35 cm length, and is free of internal discontinuities. As cladding is added the surface velocity increases, although the rate of increase slows as the radius becomes larger. The burner temperature is increased in steps with time to correspond generally to surface velocity, so as to maintain density substantially constant.

Figure 3B:
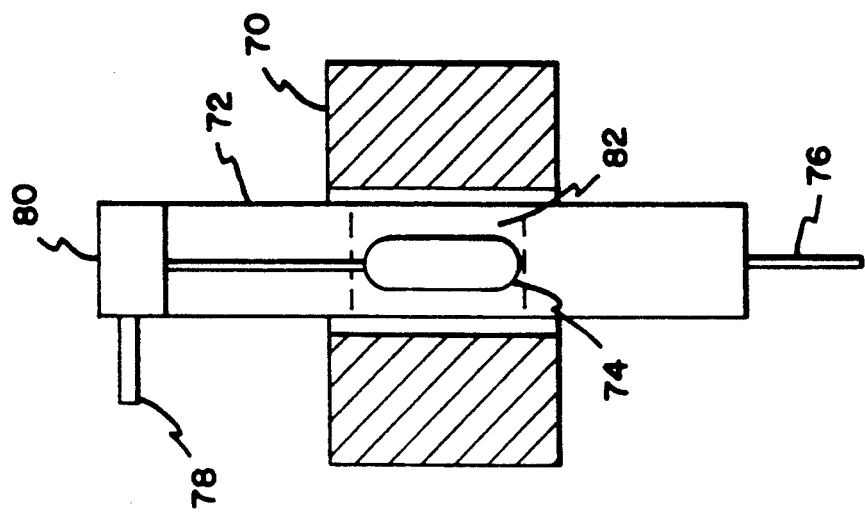
FIGS. 3A and 3B are simplified front sectional views of the furnace and front view muffle tube assembly showing different positions of a preform in the course of a method in accordance with the invention.
Figure 3A:
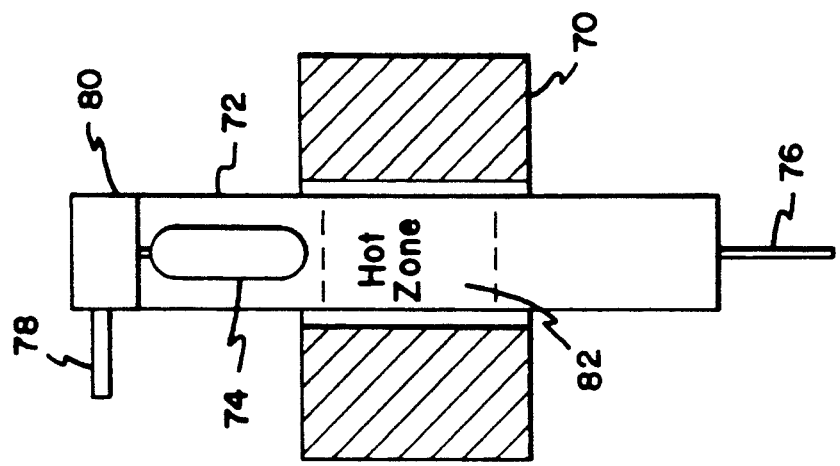

Referring to FIG. 3, comprising FIGS. 3A and 3B, the drying and sintering steps are carried out in a furnace 70 which contains a muffle tube 72 which contains the porous waveguide preform 74 which is to be dried and sintered. Flows of various gases are injected at controlled rates into the muffle tube 72 through the inlet opening 76. The gases are ejected out of the muffle tube 72 through the outlet opening 78 in the pressure control chamber 80 on top of the muffle tube 72.

For initial drying, the porous preform 74 is inserted into muffle tube 72 and the muffle tube 72 is closed. The preform 74 is in the up position as shown in FIG. 3(A) and the temperature is at 950° C. at the center of the muffle tube. All temperatures are at the center of the muffle tube 72. The preform 74 is lowered into the "hot zone" 82 as shown in FIG. 3(B) of the furnace 70 and the temperature is raised from 950° C. to 1150° C. Helium and oxygen are injected at controlled rates of 6.0 and 0.4 standard liters per minute ("sl/m"), respectively, for a period of 60 minutes. The muffle tube 72 and preform 74 are then purged by a controlled flow of helium at 7.0 sl/m for a period of 30 minutes while the temperature is held at 1150° C.

For removal of the residual water, i.e. OH, the temperature is maintained a 1150° C. while helium and chlorine are injected at controlled rates of 7.0 and 0.5 sl/m, respectively, for a period of 30 minutes. The preform 74 is then raised up out of the hot zone 82 and the muffle tube 72 is purged with a helium flow of 7.0 sl/m for a period of 70 minutes. During this period of time, the helium flow removes essentially all chlorine from the muffle tube 72 and preform 74. During this time, the temperature in the hot zone at the center of the muffle tube is raised from 1150° C. to 1450° C.

The still porous preform 74 is then consolidated by sintering. The porous preform 74 is lowered into the hot zone 82 at a controlled speed of 0.2 centimeters per minute. The preform 74 takes approximately 30 minutes to be lowered so that it is fully within the hot zone 82. During this time, a controlled helium flow of 7.0 sl/m is injected into the muffle tube 72. Once the preform 74 is fully in the hot zone 82 as shown in FIG. 3(b), it is held in that position for a period of 15 minutes while the controlled flow of helium is maintained at a rate of 7.0 sl/m and the temperature is maintained at 1450° C. At this point in time, the preform 74 has been fully consolidated or sintered into a clear glass rod preform.

After consolidation, the muffle tube 72 is cleaned by injecting a controlled flow of helium and chlorine at rate 7.0 and 0.5 sl/m, respectively while the temperature is maintained at 1450° C. for a period of 30 minutes. The muffle tube 72 is then purged for a period of 15 minutes by injecting a controlled flow of helium at a rate of 7.0 sl/m. The temperature at the center of the muffle tube 72 is then reduced 1450° C. to 950° C. over a period of 60 minutes while helium flow is maintained at a controlled rate of 7.0 sl/m. The consolidated clear glass rod preform 74 is then raised out of the hot zone 82 while nitrogen is injected at a controlled flow rate of 0.5 sl/m. The muffle tube 72 and consolidated clear glass preform 74 are cooled down to approximately 950° C. while maintaining the nitrogen flow at 0.5 sl/m. The muffle tube 74 is then opened and the consolidated preform 74 is removed.

The consolidated vitrified glass preform or rod can be cleaned in a variety of ways, including dry gas etching, high intensity laser beam polishing, or fire polishing. The glass rod preform is then drawn down, in a substantially water-free furnace environment at 2000°, to approximately 9 mm diameter start rods. These glassy rods are 1/10th or more of the diameter of the dried and sintered product. The start rods provide a total length of usable rod of the order of 150 cm, usually separated into 40-50 cm lengths. The rods are inspected for refractive index profile, clad to core diameter ratio and glass quality. Handles are attached to the ends of those individual rods having suitable characteristics, and their exteriors are cleaned. Where the t/a ratio is about 2 or greater, they are fire polished by reciprocation and rotation in an oxygen flame to provide clean surfaces for the addition of further cladding. Where t/a ratio is about 1 they may be cleaned by dry etching.

In a second cladding step, the preliminary glass preform rods are again rotated and reciprocated in front of the second burner 50, to deposit a further cladding soot layer of 11 cm thickness on the drawn rod. When built up to the suitable diameter, the redeposited rod is then dried, purged and sintered with the same procedures as set forth above to provide a final fiber preform of approximately 5.5 cm in diameter. Such preforms are themselves commercial products because many manufacturers prefer to draw their own optical waveguides. To form optical waveguide, the preform rods are drawn, in conventional fashion, to a final fiber diameter of 125 microns for operation at 1300 nm wavelength. These optical waveguide fibers, with silica-germania cores and silica cladding, are single mode fibers having a t/a ratio of about 13, and attenuation of less than 1.0 dB/km, more typically 0.4 dB/km, and dispersion of less than 3.5 ps/nm*km in the wavelength range between 1285-1330 nm.

Obtaining a combination of high growth rate, uniform soot deposition and controlled diameter with a high velocity, high angle of incidence soot stream, entails consideration of a number of complex factors as set forth in U.S. Pat. No. 5,028,246, which is herein incorporated by reference. It will be further appreciated, that a number of alternatives can be employed at different stages in the process as discussed in U.S. Pat. No. 5,028,246.

While there have been described above and illustrated in the drawings various forms and modifications in accordance with the invention, it will be appreciated that the invention is not limited thereto but encompasses all expedients and variants within the scope of the appended claims.

What is claimed is:

1. The method of making optical waveguide fibers having attenuation of less than 1 dB/km, low dispersion and relatively low cost comprising the steps of:

depositing core soot material on the rotating target element by correcting a stream of the core soot material against the target element at an angle of greater than 60° to the axis of rotation, the stream having a velocity such that the Reynolds number is greater than 100;

varying the positional relationship between the stream and the deposition surface while maintaining the angle of the stream to the axis of rotation to develop a substantially uniform density cylindrical soot core having a substantially uniform diameter in the range of 5-50 mm until a predetermined length is established;

depositing cladding soot material on the outer surface of the cylindrical core with a radial stream of cladding soot material to provide a cladding layer coextensive with the core soot cylinder;

drying the product thus formed at elevated temperature, below the sintering level, while flowing gases including chlorine about the product to remove residual water;

purging the product at elevated temperature below the sintering level with chlorine-free gases;

sintering the product at a selected temperature in excess of 1400° C. in a flowing gas stream free of chlorine by axially advancing the temperature level along the length of the cylinder and then retaining the entire cylinder at the selected temperature until complete sintering is achieved;

cooling the product thus formed; and drawing the sintered product into optical waveguide fibers.

2. The method of making an initial preform for optical waveguides having less than about 0.4 dB/km attenuation, comprising the steps of:

directing a core soot stream having a Reynolds number greater than about 100 to develop a core having a radial dimension such that the core radius after sintering is a value, a;

depositing a soot cladding layer radially on the core to a level such that the thickness, t, after sintering gives a ratio of t/a greater than 1;

heat treating the core and cladding layers by flowing gases vertically past the product along its axis of the elongation within a confined environment having a hot zone and an adjacent superior zone, the heat treating comprising:

removing residual water from the product by flowing helium and chlorine past the product in the hot zone while maintaining a temperature below the level at which sintering occurs;

purging the product and its environment of chlorine by flowing helium past the product while in the superior zone;

consolidating the product to the vitreous form by holding the temperature in the hot zone at about 1450° C. while lowering the product vertically in an axial position into the hot zone a helium is flowed past it, then retaining the product in the hot zone at the same temperature while flowing helium past it, until the product is fully sintered;

cooling the product with nitrogen flow; and removing the cooled vitrified product from the environment for further processing.

3. Method of making a vitrified optical waveguide preform that is substantially free of residual water and entrapped gases comprising the steps of:

heat treating a soot core and soot cladding cylinder by flowing gases vertically past the cylinder along its axis of elongation within a confined environment that has a hot zone and an adjacent superior zone, the heat treating comprising:

drying the cylinder in the hot zone with helium and oxygen;

purging the cylinder and environment with helium;

removing residual water from the cylinder by flowing helium and chlorine past the cylinder in the hot zone while maintaining a temperature below the level at which sintering occurs;

purging the cylinder and environment of chlorine by flowing helium past the cylinder in the superior zone;

consolidating the cylinder to the vitreous form by holding the temperature in the hot zone at about 1450° C. while lowering the cylinder vertically in an axial position into the hot zone as helium is flowed past it, then retaining the cylinder in the hot zone at the same temperature with helium flow until fully vitrified;

cleaning the environment with a mixture of helium and chlorine;

purging the environment; and cooling the environment and vitrified cylinder with a nitrogen flow;

and removing the cooled vitrified cylinder from the environment for further processing.

4. The method of making a porous soot preform for an optical waveguide and consolidating it into a vitreous state while minimizing the residual water content in the sintered product, comprising the steps of:

depositing soot core and soot cladding material to build up a soot cylinder elongated along a central axis;

developing a drying temperature level in a vertically disposed confined environment having a hot zone and cooler superior zone, while flowing helium and oxygen gases through the environment from bottom to top, and lowering the cylinder vertically down from the superior zone into the hot zone of the environment, the hot zone being at a temperature of about 950° C.;

raising the temperature in the hot zone to about 1150° C. for about 60 minutes;

purging the cylinder and confined environment with helium;

removing residual water from the cylinder in the hot zone by flowing helium and chlorine upwardly through the environment about the cylinder, the hot zone being maintained at a temperature of 1150° C.;

moving the cylinder to the superior zone and purging the product and the environment of chlorine with a helium flow, the temperature in the hot zone being at about 1450° C. and the temperature in the superior zone being below the sintering temperature level;

fully sintering the cylinder to a vitrified form by flowing helium upwardly through the hot zone, the hot zone being held at a temperature of about 1450° C., while lowering the cylinder along its axis of elongation into the hot zone at a rate of about 0.2 cm/min., the helium flow being chlorine-free;

maintaining the cylinder in the hot zone with a chlorine-free helium flow while maintaining the 1450° C. temperature, until the cylinder is fully sintered into a clear glass rod preform;

cleaning the environment with a helium and chlorine flow at elevated temperature;

purging the environment with helium flow alone at the same temperature;

cooling the glass rod preform in the superior zone with a nitrogen flow at a temperature level of approximately 950° C.; and removing the glass rod preform from the environment.

* * * * *